(12) United States Patent
Fine et al.

(10) Patent No.: US 7,868,074 B2
(45) Date of Patent: Jan. 11, 2011

(54) DISPERSIONS CONTAINING ALKOXYLATES OF ALICYCLIC POLYCYCLIC COMPOUNDS

(75) Inventors: Lisa Marie Fine, Delaware, OH (US); Charles V. Hinton, Greenville, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 915 days.

(21) Appl. No.: 11/715,879

(22) Filed: Mar. 9, 2007

(65) Prior Publication Data

US 2007/0213443 A1 Sep. 13, 2007

Related U.S. Application Data

(60) Provisional application No. 60/780,849, filed on Mar. 10, 2006.

(51) Int. Cl.
| | |
|---|---|
| *C08K 5/06* | (2006.01) |
| *C08K 3/26* | (2006.01) |
| *C08K 9/04* | (2006.01) |
| *C08K 3/34* | (2006.01) |
| *C04B 28/14* | (2006.01) |
| *B60C 1/00* | (2006.01) |
| *C08J 3/22* | (2006.01) |

(52) U.S. Cl. .................. 524/366; 524/431; 524/425; 524/423; 524/493; 524/445; 524/449; 524/451

(58) Field of Classification Search .......... 524/366, 524/431, 425, 423, 493, 445, 449, 451
See application file for complete search history.

(56) References Cited

U.S. PATENT DOCUMENTS 5,660,684 A * 8/1997 Li et al. .......... 162/5

* cited by examiner

*Primary Examiner*—William K Cheung
(74) *Attorney, Agent, or Firm*—Isaac A. Angres

(57) ABSTRACT

The present invention provides a dispersant for aqueous and non-aqueous systems which can disperse insoluble fine powders in aqueous and non-aqueous liquids in a short period of time and give long-term dispersion stability to the resulting dispersions. The dispersant is a compound of the formula

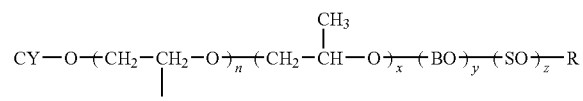

wherein CY is selected from the group consisting of aliphatic monocyclic compounds having one double bond and aliphatic polycyclic compounds with or without one double bond, or with or without bridge carbons; $(n+x+y+z)>1$; and $R=-H$, $-SO_3M$, $-CO_2M$, $-PO_3M$, $-OCR'$ wherein $M=H$, or Na, K, Li, Ca, Mg, NH4, $NH(R_1)_2$, $NH_2R_1$, $N(R_1)_3$ where $R_1$ is selected from the group consisting of $C_1$-$C_6$ alkyl and $C_1$-$C_6$ hydroxyalkyl; and $R'=C_2$-$C_{22}$ alkyl or alkenyl.

11 Claims, No Drawings

DISPERSIONS CONTAINING ALKOXYLATES OF ALICYCLIC POLYCYCLIC COMPOUNDS

This application claims the priority benefit under 35 U.S.C. section 119 of U.S. Provisional Patent Application No. 60/780,849 entitled "Dispersions Containing Alkoxylates Of Alicyclic Polycyclic Compounds" filed Mar. 10, 2006, which is in its entirety herein incorporated by reference.

FIELD OF INVENTION

This invention relates to new and useful aqueous and non-aqueous liquid pigment dispersions which are easy to handle and produce thorough and effective colorations within target media, particularly as compared to standard solid pigments or high-viscosity liquid pigment dispersions.

This invention relates to a new class of dispersants for aqueous and non-aqueous systems which can disperse pigments in aqueous and non-aqueous liquids within a short period of time and thereby give dispersions showing good dispersion stability for a prolonged period of time.

The present invention also pertains to a process of preparing aqueous and non-aqueous dispersions containing a pigment uniformly distributed throughout. In particular, the invention relates to a process of dispersing a pigment in an aqueous and non-aqueous system with alkoxylates of alicyclic and polycyclic alcohols and derivatives thereof. The invention is also directed to aqueous and non-aqueous pigment dispersions containing organic pigments and surfactants based on alkoxylates of alicyclic and polycyclic alcohols and derivatives thereof. The dispersions are produced by dispersing the pigment and the other constituents in an aqueous solvent or organic solvent, using bead mills and ultrasonic mills. The aqueous and non-aqueous organic pigment dispersions can be used in many applications such as paints, colored plastisols, nail polish compositions, printing inks including ink-jet inks or writing inks.

The present invention also relates to pigment dispersions in organic solvents containing alkoxylates of alicyclic and polycyclic alcohols and derivatives thereof as dispersing agent. The pigment dispersion can be used in paints based on organic solvents.

The present invention also provides pigment dispersions in organic solvents and which, without causing flocculation which may cause unacceptable differences in color, may be used in organic solvent based paints.

This invention also relates to pigment dispersions suitable for pigmenting hydrophilic as well as hydrophobic media. The present invention further relates to methods of preparing inorganic pigment dispersions useful in the manufacture of paints, and paints prepared therewith.

Furthermore, the invention relates to dispersants which, when pigments insoluble in organic liquids are dispersed in said organic liquids in the presence thereof, can provide dispersions particularly excellent in flowability and dispersion stability.

The present invention also relates to a pigment dispersion suitable for preparation of coating compositions wherein a pigment is finely and stably dispersed in a high concentration in a non-aqueous solvent for applications in industrial fields of inks, paints, pigmented photoresists and the like, and particularly suitable for preparation of an offset printing ink composition which is excellent both in the pigment dispersibility and in the printability. The present invention further relates to an offset printing ink composition using the pigment dispersion.

The instant invention also provides nail polish and nail lacquers containing the pigment dispersions of the invention.

The invention also relates to dispersing agents for mineral and/or organic fillers in resins intended to undergo transformation in a cold or hot state.

The present invention also relates to dispersing agents based on alkoxylates of alicyclic and polycyclic alcohols and derivatives thereof useful for dispersing mineral and/or organic fillers in thermoplastic and/or thermosetting materials, and to polymer compositions which are flowable and homogeneous (i.e., well mixed) and have a high filler content.

The invention further relates to thermoplastic and/or thermosetting polymer compositions, or polymer compositions transformable at low or high temperature, which are flowable and homogeneous, have a high filler content, and comprise one or more of the above-described dispersants.

The invention also provides novel alkoxylates of alicyclic and polycyclic alcohols and derivatives thereof.

Finally, the invention also relates to the use of the described dispersing agents and polymer compositions in the manufacture of plastic materials.

BACKGROUND OF THE INVENTION

The introduction of solids into liquid media requires high mechanical forces. This depends substantially on the wettability of the solid by the surrounding medium and on the affinity with this medium. For the purposes of reducing these dispersing forces it is conventional to use dispersants to facilitate dispersion. These are mostly surfactants or tensides having an anionic, cationic or a non-ionic structure. These agents are directly applied to the solid or added to the dispersing medium in relatively small amounts.

It is further known that these solids tend to flocculate following the dispersion, which nullifies the work earlier done and leads to serious problems. These problems have been accounted for by the London/Van der Waal's forces by which the solids attract each other. For the purposes of counteracting these attractive forces adsorption layers must be applied to the solid. This is done by using such tensides.

During and following the dispersion there is an interaction between the surrounding medium and the solid particle, resulting in a desorption of the tenside by exchange for the surrounding medium present in a higher concentration. This medium, however, is not capable in most cases of building up such stable adsorption layers, resulting in a crash of the whole system. This becomes apparent by the increase in viscosity and pseudoplasticity in liquid systems, losses of gloss and transparency, or opacity in the case of some inorganic pigments and color shifts in lacquers and coatings as well as insufficient color strength development in pigmented synthetics.

To solve this problem, e.g., EP-A 154,678, EP-A 74080, U.S. Pat. No. 4,032,698 and DE-A 24 38 414 propose the use (of) dispersants. These dispersants, however, only lead to a partial solution, particularly with respect to the miscibility without flocculation of different pigments with each other, such as organic pigments and inorganic pigments. Moreover, the pigment pastes prepared by the methods defined tend to interact with the surrounding medium, e.g., after use in lacquers. Consequently, it can be assumed that the adsorption layers built up have insufficient stability against desorption. A number of dispersants proposed in these publications further have the drawback that the storage stability is too poor, which leads to precipitation, phase separation, crystallization, etc. This results in products that are inhomogeneous and useless in practice after a relatively short time.

It is also known that pigments are widely used as colorants, for example, in paints, varnishes, and inks. Such pigments generally have average particle sizes (diameters) in the range of 0.1 to 10 micrometers, more typically, 1 micrometer or greater. To achieve these particle sizes, mechanical devices are most often used to comminute solid particulate into smaller primary particles. The most common mechanical devices include ball mills, attritors, sand/bead mills, and roll mills. The use of mechanical devices merely overcome the forces of attraction of the pigment primary particles, and physically separate these primary particles. Dispersant comes in contact with the particles at this point and is adsorbed thereupon, conveying both electrostatic and steric stability against subsequent flocculation of the particles thus separated. All of these devices require moving parts in order to generate the mechanical forces required to break up the pigment particles. Although milling times may be in the range of several hours, certain pigments require a day or longer in order to separate the particles. Moreover, comminution of the pigment by contact with the milling media, when it occurs, results in pigment surfaces exhibiting a high number of surface asperities (i.e., surface roughness and irregularities). Furthermore, contamination of the dispersions from the mechanical parts of the milling equipment can result due to the intimate contact of the pigment with the milling media. Silicon dioxide, a grinding medium, is a common contaminant found after sand milling, for example.

Another disadvantage of mechanical processing of pigments is the large breadth of distribution of particle sizes resulting from such processes. This results in the presence of particles having diameters of one micrometer or greater, even in dispersions where the average particle size is significantly less. For dispersions requiring transparency in the final article, these larger particles lead to unwanted light scattering and are detrimental. The presence of these micrometer sized particles also leads to inherent instability, or tendency to flocculate, in the dispersions.

More stable pigment dispersions can be obtained by chemically altering the pigment. This often results in smaller average particle diameters but has the disadvantages of requiring a chemical pretreatment of the pigment, still requiring mechanical milling, and still providing a dispersion having a wide particle size distribution.

Current pigment dispersants are effective to some degree in dispersing a pigment at a higher concentration in a non-aqueous or aqueous dispersion medium and in stabilizing the dispersion, but do not offer a satisfactory effect on stabilization of a fine dispersion of the pigment.

The products commonly employed in the prior art i.e., carbon black dispersants in coatings are salts of an acrylic acid copolymer, acetylenic diol surfactants, or polyalcohol ethers which fit into various classes of wetting and dispersing agents (Calbo, Handbook of Coatings Additives, Dekker pg. 516). Such additives could be called on to function as more than a dispersant and can also act in one or more of the following ways: (a) to prevent flocculation, (b) to prevent hard settling, (c) to improve jetness/color/gloss, (d) to control viscosity, and/or (e) to improve wetting of the base resin.

Various considerations are important in determining the usefulness of any additive as a dispersing agent for use with a carbon black or with other pigments, depending upon the product into which such a dispersion is to be incorporated. When used throughout this application the terms pigment(s) or pigment dispersion(s) are intended to encompass various materials which may be intended to impart either color and/or serve some other function, such as for example the use of carbon black in rubber where, in addition to adding color, such also acts as a reinforcing agent.

One of the most important considerations in determining whether a particular dispersant will be useful for use with a given pigment or pigments when such a pigment is to be used in a paint or coating composition is whether such a dispersant/pigment combination will or will not impart a conductive nature or characteristic to the dried paint film or coating into which it has been added.

The automotive industry is replacing and will continue to replace exterior metal body panels on vehicles with plastic and composite body panels. Some reasons for this change are weight reduction, flexibility of design, and lower tooling costs. The replacement of metal body panels by plastics and composites is not without difficulties.

One problem of note is the electrostatic spray painting of plastics. Electrostatic spray painting is the preferred manner of applying automotive topcoats. Spray painting normally gives the best appearance to the vehicle and the electrostatic technique assures the most economical use of the material. The problem arises because plastics do not paint well electrostatically unless a conductive primer is used.

Amongst the most important considerations for determining the utility of any dispersant to be used in conjunction with conductive carbon blacks are the following: the inherent rheological stability of the dispersion, both alone and when added to a formulated paint; maintenance of conductive properties in the resulting coating; resistance to flocculation of the carbon black/dispersant mixture and in the final paint or coating; and ability to achieve low viscosity at high pigment loadings.

The various prior art references of which the applicants are aware which relate to dispersing agents for pigment additives, such as carbon blacks, suffer from a number of shortcomings. The most significant shortcomings of the carbon black dispersants of the prior art, including those used for conductive carbon blacks, are: high levels of dispersant may be required which tends to detrimentally affect the physical properties of formulated paints, such as adversely affecting the resultant humidity resistance, yellowing upon exposure to UV light, loss of cure in melamine cross-linked systems, and other undesirable effects; inability to prevent reflocculation of carbon black, resulting in the loss of electrical conductivity in dried paint films; and incompatibility of the dispersant with the particular resin system selected for use in the final paint formulation.

Additionally, more and more paints are produced which are water-based and completely free from organic solvents, such as glycol ethers. When toning these paints to the desired color, use is made to a great extent of pigment dispersions, which can be used both for water-based paint and for paint based on organic solvents. The pigment dispersions are normally composed of pigments, fillers, dispersing agents and an aqueous phase which contains ethylene glycol, di- and triethylene glycol, propylene glycol, dipropylene glycol, tripropylene glycol or glycerol. In most cases, the dispersing agent is a nonionic surface-active compound or a combination of nonionic and anionic surfactants. For environmental reasons, it is, however, desirable that the pigment dispersions are solvent-free.

Also, in the production of inks and paints, wetting agents and dispersants facilitate the incorporation of pigments and fillers, which are important formulation constituents that determine significantly the visual appearance and the physicochemical properties of coatings. Optimum utilization requires firstly that the solids are distributed uniformly in paints and inks and secondly that the state of distribution, once attained, is stabilized. In many cases, the stabilizing effect depends on binder components as well. This is particularly the case with acidic (styrene) acrylates, which are used, in particular, in the preparation of printing inks. In these cases, pigment wetting agents are used, whose action consists in wetting the pigment surface rapidly, which displace the air from the surface of the pigments, and replace it by the liquid of the millbase. Especially when solids with a nonpolar surface are used in aqueous coating materials, the wetting must be assisted by wetting agents. This permits favorable development of color strength and thus virtually ideal utilization of the energy introduced.

Moreover, especially in the architectural paints industry, use is made of aqueous pigment pastes, with or without co-solvent, which are used universally for tinting in aqueous emulsion paints on an all-acrylate, styrene/acrylate or silicate basis and in non-polar decorating paints based on long-oil alkyds.

Particularly suitable for this purpose are alkylphenol ethoxylates or fatty alcohol alkoxylates, which also contribute to steric stabilization of dispersed pigment states. The high-performance alkylphenol ethoxylates have come under criticism on eco-toxicological grounds, and their use in laundry detergents and cleaning products is already banned in many countries. Similar bans may be expected for the paint and printing inks industry. Fatty alcohol ethoxylates in many cases fail to achieve the good properties of the alkylphenol-ethoxylates. The nonyl and octyl phenol ethoxylates have shown some utility in enhancing dispersibility of organic pigments. However, they have also demonstrated long term viscosity stability problems. Since they lack groups capable of adsorption, the pigment wetting properties are less pronounced. Moreover, the non-adsorbed portion of this product group, in particular, has the undesirable effect of stabilizing the foam, which can be suppressed only with the aid of substances having a strong defoaming action, which, in turn, induce other adverse phenomena, such as unwanted surface defects. The use of numerous dispersing additives also has a negative impact on the water resistance or light stability of coatings.

The shortcomings of the prior art dispersing agents noted above may be overcome by employing alkoxylates of alicyclic and polycyclic compounds and derivatives thereof in accordance with the present invention.

OBJECTS OF THE INVENTION

It is a first object of the present invention to provide novel pigment dispersions incorporating novel surfactants.

It is another object of the invention to provide novel pigment dispersions containing surfactants based on alkoxylates of alicyclic and polycyclic alcohols and derivatives thereof.

A further object of the invention is to provide novel carbon black dispersions containing novel surfactants.

A still further object of the invention is to provide novel carbon black dispersions incorporating alkoxylates of alicyclic and polycyclic alcohols and derivatives thereof.

An additional object of the invention is to provide novel non-aqueous pigment dispersions incorporating alkoxylates of alicyclic and polycyclic alcohols and derivatives thereof.

A still further object of the invention is to provide non-aqueous carbon black dispersions containing surfactants based on alkoxylates of alicyclic and polycyclic alcohols and derivatives thereof.

An additional object of the present invention is mixtures of alkoxylates of alicyclic and polycyclic alcohols and derivatives thereof.

Still, another object of the invention are pigment dispersions having a very high tinctorial strength and brilliance, an excellent levelness and covering power in opaque applications.

A further object of the invention is to provide thermoplastic and/or thermosetting polymer compositions, or polymer compositions transformable at low or high temperature, which are the basis for plastics materials with improved physical and chemical properties such as mechanical, thermal, dielectric, and esthetic properties comprising at least one dispersing agent.

Another important object of the invention is to provide alkoxylates of alicyclic and polycyclic alcohols and derivatives thereof.

A still further object of the invention is to provide printing inks incorporating alkoxylates of alicyclic and polycyclic alcohols and derivatives thereof.

These and other objects of the present invention will more readily become apparent from the description and examples which follow.

SUMMARY OF THE INVENTION

The instant invention provides a compound of the formula:

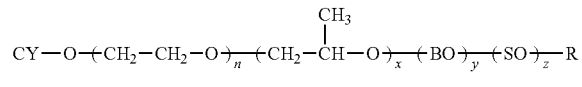

wherein CY is selected from the group consisting of aliphatic monocyclic compounds having one double bond and aliphatic polycyclic compounds with or without one double bond, or with or without bridge carbons; (n+x+y+z)>1; and R=—H, —SO$_3$M, —CO$_2$M, —PO$_3$M, —OCR' wherein M=H, or Na, K, Li, Ca, Mg, NH$_4$, NH(R$_1$)$_2$, NH$_2$R$_1$, N(R$_1$)$_3$ where R$_1$ is selected from the group consisting of C$_1$-C$_6$ alkyl and C$_1$-C$_6$ hydroxyalkyl; and R'=C$_2$-C$_{22}$ alkyl or alkenyl.

The invention further provides compounds of the formula:

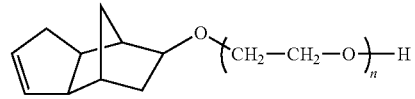

wherein n=1-300.

The present invention is also directed to a pigment dispersion comprising: (a) a pigment; (b) a solvent; and (c) a surfactant the formula:

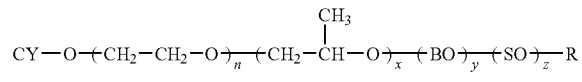

wherein CY is selected from the group consisting of aliphatic monocyclic compounds having one double bond and aliphatic polycyclic compounds with or without one double bond, or with or without bridge carbons; (n+x+y+z)>1; and R=—H, —SO$_3$M, —CO$_2$M, —PO$_3$M, —OCR' wherein M=H, or Na, K, Li, Ca, Mg, NH$_4$, NH(R$_1$)$_2$, NH$_2$R$_1$, N(R$_1$)$_3$ where R$_1$ is selected from the group consisting of C$_1$-C$_6$ alkyl and C$_1$-C$_6$ hydroxyalkyl; and R'=C$_2$-C$_{22}$ alkyl or alkenyl.

The present invention is also directed to a pigment dispersion comprising: (a) a pigment; (b) a solvent; (c) a polymeric resin; and (d) a surfactant the formula:

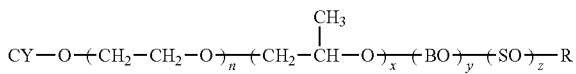

wherein CY is selected from the group consisting of aliphatic monocyclic compounds having one double bond and aliphatic polycyclic compounds with or without one double bond, or with or without bridge carbons; (n+x+y+z)>1; and R=—H, —SO$_3$M, —CO$_2$M, —PO$_3$M, —OCR' wherein M=H, or Na, K, Li, Ca, Mg, NH$_4$, NH(R$_1$)$_2$, NH$_2$R$_1$, N(R$_1$)$_3$ where R$_1$ is selected from the group consisting of C$_1$-C$_6$ alkyl and C$_1$-C$_6$ hydroxyalkyl; and R'=C$_2$-C$_{22}$ alkyl or alkenyl.

The invention is also directed to a pigment dispersion comprising 20% to 60% by weight of pigment, 0% to 75% by weight of an organic solvent, 0% to 50% water, and 0.01% to 35% by weight of a pigment dispersant, said pigment dispersant being a compound of the formula

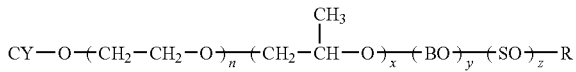

wherein CY is selected from the group consisting of aliphatic monocyclic compounds having one double bond and aliphatic polycyclic compounds with or without one double bond, or with or without bridge carbons; (n+x+y+z)>1; and R=—H, —SO$_3$M, —CO$_2$M, —PO$_3$M, —OCR' wherein M=H, or Na, K, Li, Ca, Mg, NH$_4$, NH(R$_1$)$_2$, NH$_2$R$_1$, N(R$_1$)$_3$ where R$_1$ is selected from the group consisting of C$_1$-C$_6$ alkyl and C$_1$-C$_6$ hydroxyalkyl; and R'=C$_2$-C$_{22}$ alkyl or alkenyl.

The invention further provides a polymer composition comprising: (a) a thermoplastic resin selected from the group consisting of: (i) low- or high density polyethylene, linear or branched, (ii) homo- or copolymeric polypropylenes, (iii) polyisobutylenes, (iv) copolymers of two or more of the monomers, ethylene, propylene, and butylene, (v) polyvinyl chlorides, polystyrenes, and polyolefins, optionally halogenated and optionally modified by grafting or copolymerization; polyesters, polyamides and polycarbonates, or a thermosetting resin selected from the group consisting of acrylic resins, phenolic resins, amino-plastic resins, epoxy resins, reactive resins used to produce polyurethanes, alkyd resins, and unsaturated polyester resins produced by condensation reactions of maleic anhydride with or without the presence of phthalic derivatives with an alkylene glycol or a low molecular weight polyalkylene glycol, in styrene wherewith said polyester is copolymerizable with said styrene;

(b) an additive selected from the group consisting of: (i) one or more mineral fillers, organic fillers of natural or synthetic origin or a mixture thereof wherein said one or more mineral fillers is selected from the group consisting of titanium dioxide, natural calcium carbonate, precipitated calcium carbonate, magnesium carbonate, zinc carbonate, dolomite, lime, magnesia, barium sulfate, calcium sulfate, aluminum hydroxide, magnesium hydroxide, silica, wollastonite, clays, talc, mica, solid glass spheres, hollow glass spheres, and metal oxides and wherein said organic fillers are selected from the group consisting of organic materials of natural and synthetic origin, and (ii) one or more additives selected from the group consisting of antioxidants, metal deactivators, light stabilizers, pvc stabilizers, plasticizers, lubricants, processing aids, impact modifiers, fiber reinforcements, flame retardants, antistatic agents, fluorescent whitening agents, biostabilizers, antimicrobials, chemical blowing agents, organic peroxides, nucleating agents, polymerization catalysts, grafting catalysts, thermal stabilizers, photochemical stabilizers, shrink-preventive agents, antistatic agents, mold-release agents, glass fibers, and mineral thickeners and mixtures thereof, and mixtures of (i) and (ii); and (c) a dispersant of the formula

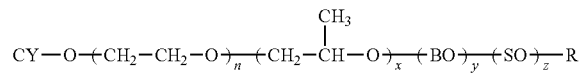

wherein CY is selected from the group consisting of aliphatic monocyclic compounds having one double bond and aliphatic polycyclic compounds with or without one double bond, or with or without bridge carbons; (n+x+y+z)>1; and R=—H, —SO$_3$M, —CO$_2$M, —PO$_3$M, —OCR' wherein M=H, or Na, K, Li, Ca, Mg, NH$_4$, NH(R$_1$)$_2$, NH$_2$R$_1$, N(R$_1$)$_3$ where R$_1$ is selected from the group consisting of C$_1$-C$_6$ alkyl and C$_1$-C$_6$ hydroxyalkyl; and R'=C$_2$-C$_{22}$ alkyl or alkenyl.

The instant invention further provides a method of preparing a polymer composition comprising mixing a dispersing agent of the formula

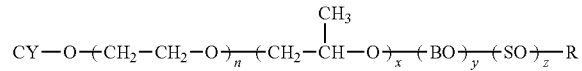

wherein CY is selected from the group consisting of aliphatic monocyclic compounds having one double bond and aliphatic polycyclic compounds with or without one double bond, or with or without bridge carbons; (n+x+y+z)>1; and R=—H, —SO$_3$M, —CO$_2$M, —PO$_3$M, —OCR' wherein M=H, or Na, K, Li, Ca, Mg, NH$_4$, NH(R$_1$)$_2$, NH$_2$R$_1$, N(R$_1$)$_3$ where R$_1$ is selected from the group consisting of C$_1$-C$_6$ alkyl and C$_1$-C$_6$ hydroxyalkyl; and R'=C$_2$-C$_{22}$ alkyl or alkenyl, with a polymer and an additive selected from the group consisting of: (i) one or more mineral fillers, organic fillers of natural or synthetic origin or a mixture thereof wherein said one or more mineral fillers is selected from the group consisting of titanium dioxide, natural calcium carbonate, precipitated calcium carbonate, magnesium carbonate, zinc carbonate, dolomite, lime, magnesia, barium sulfate, calcium sulfate, aluminum hydroxide, magnesium hydroxide, silica, wollastonite, clays, talc, mica, solid glass spheres, hollow glass spheres, and metal oxides and wherein said organic fillers are selected from the group consisting of organic materials of natural and synthetic origin, and (ii) one or more additives selected from the group consisting of antioxidants, metal deactivators, light stabilizers, pvc stabilizers, plasticizers, lubricants, processing aids, impact modifiers, fiber reinforcements, flame retardants, antistatic agents, fluorescent whitening agents, biostabilizers, antimicrobials, chemical blowing agents, organic peroxides, nucleating agents, polymerization catalysts, grafting catalysts, thermal stabilizers, photochemical stabilizers, shrink-preventive agents, antistatic agents, mold-release agents, glass fibers, and mineral thickeners and mixtures thereof, and mixtures of (i) and (ii).

The invention is also directed to a polymeric composition comprising: (a) a polymer; (b) an inorganic or organic additive; and (c) a dispersant of the formula

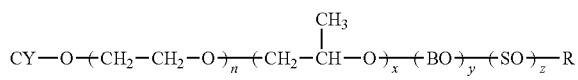

wherein CY is selected from the group consisting of aliphatic monocyclic compounds having one double bond and aliphatic polycyclic compounds with or without one double bond, or with or without bridge carbons; $(n+x+y+z)>1$; and $R=$—H, —$SO_3M$, —$CO_2M$, —$PO_3M$, —$OCR'$ wherein M=H, or Na, K, Li, Ca, Mg, $NH_4$, $NH(R_1)_2$, $NH_2R_1$, $N(R_1)_3$ where $R_1$ is selected from the group consisting of $C_1$-$C_6$ alkyl and $C_1$-$C_6$ hydroxyalkyl; and $R'=C_2$-$C_{22}$ alkyl or alkenyl.

The instant invention further provides a compound of the formula:

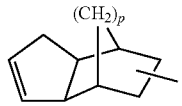

wherein n=1-300 and $R=C_2$-$C_{22}$ alkyl or alkenyl.

DESCRIPTION OF THE PREFERRED EMBODIMENTS

The invention relates to a compound of the formula

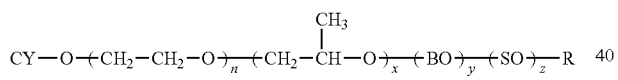

wherein CY is selected from the group consisting of aliphatic monocyclic compounds having one double bond and aliphatic polycyclic compounds with or without one double bond, or with or without bridge carbons; $(n+x+y+z)>1$; and $R=$—H, —$SO_3M$, —$CO_2M$, —$PO_3M$, —$OCR'$ wherein M=H, or Na, K, Li, Ca, Mg, $NH_4$, $NH(R_1)_2$, $NH_2R_1$, $N(R_1)_3$ where $R_1$ is selected from the group consisting of $C_1$-$C_6$ alkyl and $C_1$-$C_6$ hydroxyalkyl; and $R'=C_2$-$C_{22}$ alkyl or alkenyl.

In the above formula, CY is particularly selected from the group consisting of:

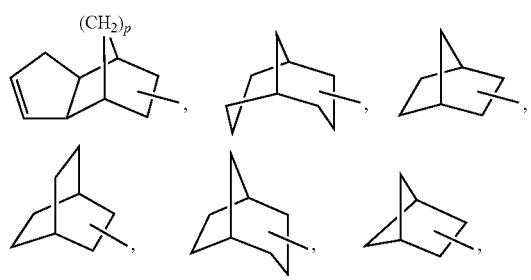

-continued

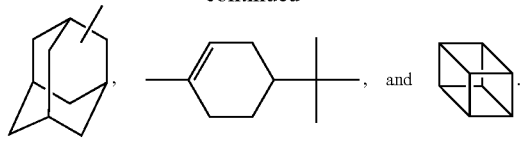

A particularly preferred CY group is

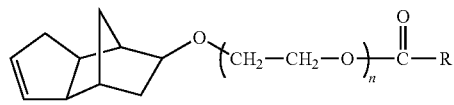

wherein p=0-2 and more preferably the CY group is one where p=1.

The dispersants of the present invention where R=H, are manufactured by reacting a compound of the formula CYOH wherein CY is particularly selected from the group consisting of:

wherein p=0-2 with an alkylene oxide, mixtures of alkylene oxides and styrene oxide in the presence of a basic catalyst such as potassium hydroxide or an alkali metal alkoxide such as sodium or potassium methoxide.

More specifically the process for alkoxylation includes the steps of: adding the catalyst to the organic compound containing at least one hydroxyl group; heating and pressurising a reactor containing the hydroxyl containing organic compound; supplying alkylene oxide to said organic compound and catalyst at a process temperature of between 50° and 250° C. and at a pressure of between 100 and 700 kPa and isolating the alkoxylation products.

An important factor in obtaining the properties of the compounds are the numerical values of the indices n, x, y and z. Indice n defines the number of ethylene oxide groups. It being possible for n to adopt values of from about 1 to about 300, preferably from 50 to 90. Indice x defines the number of propylene oxide groups and has a value of from 0 to about 100, preferably from about 1 to about 50. Indice y determines the number of butylene oxide groups and likewise has a value of from 0 to about 100, preferably 1 to 50. Indice z indicates the number of styrene oxide groups, which, especially in the case of hydrophobic pigment surfaces, provides for high adsorption and z here has a value of from about 0 to about 20 more preferably from about 1 to about 2. The skilled worker is well aware that the compounds are present in the form of a mixture having a distribution governed essentially by laws of statistics. It is the case that mixed alkoxylates are intended for use in accordance with the invention. By means of the different alkylene oxide monomers and their fraction in the overall polymer it is possible to exert specific control over the hydrophobic/hydrophilic balance such that it is possible to tailor any steric requirements of the pigment surface, and, in particular, to tailor the compatibility in the respective coating system. The alkylene oxide groups may be arranged at random or in blocks. Particular preference is given to block arrangements with fairly hydrophobic terminal groups such as propylene oxide or, in particular, butylene oxide. The ratio of the molar amounts of the ethylene oxide groups to the other hydrophobic alkylene oxide groups is adjusted as necessary to achieve the desired properties.

The performance properties of the novel compounds of the invention may be optimized for a specific application by appropriate modification such as the degree of alkoxylation and the different alkylene oxides that are used, and the choice of group used as an end cap. The interplay between these factors appears to be complex and is not well-understood. However, it is clear that manipulation of these variables allows access to materials which can perform as emulsifiers or detergents, wetting agents, foaming agents, defoamers, rheology modifiers or associative thickeners, dispersants, and the like. As such, these products will be useful in applications such as coatings, inks, adhesives, agricultural formulations, fountain solutions, photoresist strippers/developers, soaps, shampoos, and other cleaning compositions. They should also find use in oil-field applications such as enhanced oil recovery, fracturing and stimulation processes, and drilling and cementing operations, and in various wet-processing textile operations, such as dyeing of fibers, fiber scouring and kier boiling, and so on.

The compounds where R=—$SO_3M$, —$CO_2M$, —$PO_3M$, —OCR' wherein M=H, or Na, K, Li, Ca, Mg, $NH_4$, $NH(R_1)_2$, $NH_2R_1$, $N(R_1)_3$ where $R_1$ is selected from the group consisting of $C_1$-$C_6$ alkyl and $C_1$-$C_6$ hydroxyalkyl; and R'=$C_2$-$C_{22}$ alkyl or alkenyl are prepared by reacting the compound where R=H with the appropriate reagent as known in the art to give the corresponding product. For example, when making the —OCR' product, the alkoxylated intermediate above is reacted with an equimolar amount of a $C_2$-$C_{22}$ saturated or unsaturated acid in the presence of p-toluenesulfonic acid as a catalyst. The reaction is conducted in a suitable reactor at a temperature range of about 100°-160° C., more preferably at a temperature range of 120°-135° C. and most preferably at a temperature range of 145°-160° C.

Our invention also relates to the use of the above-defined alkoxylates of alicyclic and polycyclic alcohols and derivatives thereof as a pigment dispersant for non-aqueous dispersions, aqueous dispersions and dispersions containing both water and organic solvents.

In accordance with one embodiment of the present invention, there is provided a pigment dispersion comprising a pigment, a non-aqueous solvent and a pigment dispersant of the formula

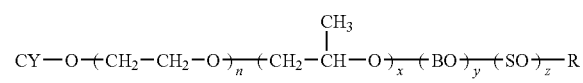

wherein CY is selected from the group consisting of aliphatic monocyclic compounds having one double bond and aliphatic polycyclic compounds with or without one double bond, or with or without bridge carbons; (n+x+y+z)>1; and R=—H, —$SO_3M$, —$CO_2M$, —$PO_3M$, —OCR' wherein M=H, or Na, K, Li, Ca, Mg, $NH_4$, $NH(R_1)_2$, $NH_2R_1$, $N(R_1)_3$ where $R_1$ is selected from the group consisting of $C_1$-$C_6$ alkyl and $C_1$-$C_6$ hydroxyalkyl; and R'=$C_2$-$C_{22}$ alkyl or alkenyl.

In another embodiment there is provided a pigment dispersion comprising 20% to 60% by weight of pigment, 5% to 75% by weight of a solvent selected from the group consisting of water, organic solvents including solvents that are miscible with water, and mixtures thereof, and 0.01% to 35% by weight of a pigment dispersant, said pigment dispersant being a compound of the formula

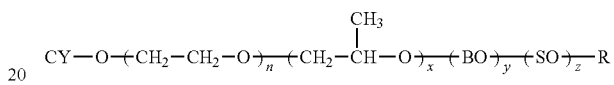

wherein CY is selected from the group consisting of aliphatic monocyclic compounds having one double bond and aliphatic polycyclic compounds with or without one double bond, or with or without bridge carbons; (n+x+y+z)>1; and R=—H, —$SO_3M$, —$CO_2M$, —$PO_3M$, —OCR' wherein M=H, or Na, K, Li, Ca, Mg, $NH_4$, $NH(R_1)_2$, $NH_2R_1$, $N(R_1)_3$ where $R_1$ is selected from the group consisting of $C_1$-$C_6$ alkyl and $C_1$-$C_6$ hydroxyalkyl; and R'=$C_2$-$C_{22}$ alkyl or alkenyl.

In the present specification, the term "non-aqueous" denotes a composition into which no water has been specifically introduced. Due to the possibility of atmospheric water being introduced through exposure to a relatively humid environment, this term does not rule out the potential for any water to be present through such a manner. The term "liquid dispersion" is intended to encompass any composition which is present in a fluid state (i.e., possessing a viscosity of below about 10,000 centipoise at standard temperature and pressure).

The non-aqueous solvent usable in the present invention varies depending upon the use of the pigment dispersion of the present invention. For instance, examples of the non-aqueous solvent for use in paints are usual organic solvents such as esters, ethers, ketones, alcohols, and aromatic solvents. Examples of other non-aqueous solvent include the glycol ethers such as ethylene glycol monoethyl ether, diethylene glycol monoethyl ether, diethylene glycol dimethyl ether and dipropylene glycol monoethyl ether, glycol monoether acetates such as ethylene glycol monoethyl ether acetate, propylene glycol monomethyl ether acetate and diethylene glycol monoethyl ether acetate, ketones such as cyclohexanone and methyl ethyl ketone, amides such as N,N-dimethylacetamide and N-methylpyrrolidone, lactones such as γ-butyrolactone, and acetic acid esters such as butyl acetate. Preferable as the non-aqueous solvent for use in printing inks, particularly offset printing inks are lipophilic solvents such as vegetable oils and mineral oils.

The instant invention also provides aqueous based inks which utilize the dispersants of the present invention.

A typical water-based coating composition to which the surfactants of the invention may be added may comprise the following components in an aqueous medium at 30 to 80 wt % solids: (a) 0 to 50 wt % of a pigment dispersant/grind resin; (b) 0 to 80 wt % of coloring pigments/extender pigments/anti-corrosive pigments/other pigment types; (c) 5 to 94.98 wt % of a water-borne/water-dispersible/water-soluble resin; (d) 0 to 30 wt % of slip additives/antimicrobials/processing aids/ defoamers; (e) 0 to 50 wt % of coalescing or other solvents; (f) 0.01 to 10 wt % of surfactant/wetting agent/flow and leveling agents; and (g) 0.01 to 5 wt % of the new surfactants of the instant invention.

A typical water-based ink composition to which the surfactants of the invention may be added comprise the following components in an aqueous medium at 20 to 60% solids: (a) 1 to 50 wt % of a pigment; (b) 0 to 50 wt % of a pigment dispersant/grind resin; (c) 0 to 50 wt % of a clay base in appropriate resin solution vehicle; (d) 5 to 93.97 wt % of a water-borne/water-dispersible/water-soluble resin; (e) 0 to 30 wt % of coalescing solvents; (f) 0.01 to 10 wt % of a surfactant/wetting agent; (g) 0.01 to 10 wt % of processing aids/ defoamers/solubilizing agents; and (h) 0.01 to 5 wt % of alkoxylates of alicyclic and polycyclic alcohols and derivatives thereof.

In applications where resins are present, plasticizers are an important component of the formulation. Examples of plasticizers that are suitable include benzyl butyl phthalate, dibutyl phthalate, triphenyl phosphate, 2-ethyl hexyl benzyl phthalate and dicyclohexyl phthalate. Other well-known plasticizers which may be employed include dinonylphthalate, diisononylphthalate, diallyl phthalate, dibenzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethylhexyl ester of hexamethylene diphthalate, and di(methylcyclohexyl)phthalate. The particular plasticizer and the amount thereof used are chosen in accordance with the demand for compatibility.

The present invention is intended to include all compounds wherein n, x, y and z are as defined above. The propoxylated as well as the mixed product ethoxylate/propoxylate and ethoxylate/propoxylate/styroxylate are also intended to be included within the scope of the present invention.

The preferred dispersing agent/surfactant of the invention has the formula

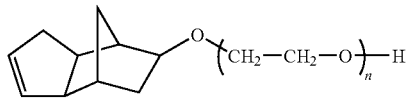

wherein n=70 or higher.

The pigment of the dispersion of the present invention may be selected from inorganic pigments (such as carbon black pigments, e.g., furnace blacks, electrically conductive carbon black pigments, extender pigments and corrosion inhibitive pigments); organic pigments; dispersed dyes; and mixtures thereof. Examples of organic pigments that may be present in the pigment dispersion include, but are not limited to, perylenes, phthalo green, phthalo blue, nitroso pigments, monoazo pigments, diazo pigments, diazo condensation pigments, basic dye pigments, alkali blue pigments, blue lake pigments, phloxin pigments, quinacridone pigments, lake pigments of acid yellow 1 and 3, carbazole dioxazine violet pigments, alizarine lake pigments, vat pigments, phthaloxy amine pigments, carmine lake pigments, tetrachloroisoindolinone pigments and mixtures thereof. Inorganic pigments that may be present in the pigment dispersion, include, for example, titanium dioxide, electrically conductive titanium dioxide, and iron oxides, e.g., red iron oxides, yellow iron oxides, black iron oxides and transparent iron oxides. Extender pigments that may be present in the pigment dispersion include, but are not limited to, silicas, clays, alkaline earth metal sulfates and carbonates, such as calcium sulfate, magnesium sulfate, barium sulfate, and calcium carbonate. The pigment dispersion may contain corrosion inhibitive pigments, such as aluminum phosphate and calcium modified silica. Mixtures of organic and inorganic pigments are also suitable for making the dispersions of the present invention.

Pigment blacks with an average primary particle diameter of 8 to 80 nm, preferably 10 to 35 nm, and a DBP number of 40 to 200 ml/100 g, preferably 60 to 150 ml/100 g, can be used as the carbon black. In a preferred embodiment of the invention, gas blacks with an average primary particle diameter of 8 to 30 nm, preferably 10 to 25 nm, can be used.

The pigment dispersions according to the invention contain 1 to 65% by weight, preferably 30 to 50% by weight, of pigment, 0.01 to 35% by weight, preferably 0.1 to 20% by weight, of the products, 0 to 20%, preferably 0 to 5%, of additional nonionic or anionic surface-active agents, and 25 to 40% by weight of a solvent.

The amount of dispersants depends on the specific materials employed and the concentration of pigment in the dispersion required. For inorganic pigments, such as titanium dioxide and iron oxide pigment, the amount used is typically in the range 0.02 to 10%, commonly 0.05 to 5% and more usually 0.1 to 2.5%, by weight of the pigment; for organic pigments such as phthalocyanines, somewhat higher levels of dispersant may be used, typically in the range 0.02 to 50%, more usually from 0.1 to 30%, by weight of the pigment; and for carbon black the amount of dispersant is typically in the range 0.02 to 30%, more usually from 0.1 to 20%, by weight of the pigment.

When incorporated into end use products such as paints or surface coatings typical pigment levels on the final product will be from about 0.02 to about 12%, particularly about 0.1 to about 10%, pigment by weigh based on the total paint or surface coating. Where coloured inorganic pigments are used, the levels will typically be from about 0.05 to about 12%, particularly about 0.2 to about 10%, for white pigments, particularly titanium dioxide, the pigment may be present to provide opacity and not just colour and will often be present at concentrations e.g. in base paint formulations, of up to 25%, typically from 0.2 to 25%, by weight; for organic pigments, especially phthalocyanine pigments, the levels will typically be up to about 8% typically from about 0.05 to about 8%, particularly about 0.1 to about 5%; and for carbon black the levels will typically be from about 0.05 to about 8%, particularly about 0.2 to about 5%.

The non-aqueous pigment dispersion composition of the present invention is prepared by adding a pigment to a non-aqueous solution of a pigment dispersant, disaggregating and dispersing the pigment in the solution by means of a dispersing machine such as roll mill, ball mill or sand mill, diluting the resultant dispersion to a desired concentration and removing larger particles therefrom by way of centrifugation, Scharples-type centrifugation and filtration. If a desired particle-size distribution cannot be obtained by the first particle classification process, the dispersing process and particle classification process are repeated until the desired particle-size distribution is obtained. In most instances, if the proportion of particles impassable through a sieve having a mesh size of 300 nm is not greater than 30%, there is no need for particle classification. Thus, the pigment contained in the dispersion has a median particle size of not greater than 250 nm, preferably not greater than 200 nm with not greater than 30% of the pigment particles being impassable through the sieve having a mesh size of 300 nm.

Also, the pigment dispersion according to the invention can be produced by first preparing a pigment-free mixture of the surface-active compounds, the non-aqueous solvent, the antifoaming agents and any other additives, and subsequently adding the pigment portion which is dispersed in the mixture. The dispersion can be carried out by means of a dissolver or grinder, for instance a ball grinder or roller mill.

The dispersion of the invention is preferably storage stable. By this term, it is intended that the inventive dispersion will remain in a fluid state with substantially no precipitation or reagglomeration of pigment for at least 60 days while being continuously exposed to a temperature of at least 50° C. Such a test is one manner of reproducing long-term storage conditions and thus is not intended as being the sole limitation of temperature within this invention. One of ordinary skill in this art would appreciate the need to provide a modified test of this nature. Thus, the inventive dispersions must merely exhibit substantially no precipitation and retention of its fluid state (low viscosity) after exposure to high temperature storage for 60 days.

The pigment dispersions according to the invention can be employed for all purposes and are excellently suitable for the production of emulsion paints based on polyvinyl acetate, polyvinyl acetate copolymers, styrene-butadiene copolymers, polyvinyl propionates, acrylic and methacrylic acid ester polymers, saponified alkyd resins and oil emulsions; for the production of wallpaper paints based on cellulose derivatives such as methylcellulose, hydroxymethylcellulose and carboxymethylcellulose, and for the production of printing inks which contain, as binders, mainly saponified natural resins, such as shellac, saponified water-soluble synthetic resins or acrylate binder solutions.

The dispersant of the invention find uses in many applications. In many applications it dispersed pigment, polymer, plasticizer, and plastisols. In both applications, lower viscosity and higher color yield for the pigment resulted. When lower viscosity is achieved, it allows either increased shear of the particulate matter added, be it pigment or dyes. Increased shear and consequent increases in color development occur when the dispersion viscosity is higher—one way to get there is to raise the pigment loading, which increases one's throughput. If one can make a dispersion at 45% pigment loading due to the deflocculation characteristics of a particular dispersant when one only needs 35% pigment in the finished product, time and cost savings can be realized by making the dispersion at the higher loading to maximize shear and color development, then dilute to the desired product pigment loading. More finished product is therefore made in less time.) In the case of pigment, this offers increase color strength; thus, saving money for the end user. The dispersant of the invention does not coalesce the polymer, but lowers the particle size of it, which makes for a more efficient coating. This offers what is known as 'plate out' prevention with injection plastisol machines.

The dispersants of the invention also work with combinations of Pigment Red 57:1, diiso nonyl phthalate, and fluorescent pigments, which are made with formaldehyde resins, benzoquinoneimines, and melamine formaldehyde. They are essentially dyed polymers. They also work with any oil, or liquid plastic plastisol dispersion, where water is not present, and pigment, dye, or any particulate matter has to be dispersed. This includes inks, paints, any coating. Possibilities are solvent-borne resins, which include Alkyds, Alkyd Copolymers, Oil Modified Urethanes (OMU), Polyesters and Solution Acrylics.

Although Applicant does not wish to be bound by theoretical explanations of interfacial phenomena, it is believed that the dispersant of the invention works by drastically lowering the interfacial tension of the polymer/plasticizer and the pigment. When shear is applied, the polymer/plasticizer and pigment breaks into smaller particles. Since the dispersant of the invention has a high affinity for low HLB type polymers, steric hindrance takes place to keep the particles evenly spaced in a lower energy state. This allows for further development of the pigment color using the conventional dispersing equipment. After a lower viscosity is attained, many options exist for the user. Higher solids can be gained on pigment, resin, or plasticizer, not to mention the possible increase in color yield.

In another preferred embodiment of the invention, additives useful for making synthetic resin products are dispersed into the resins using the dispersant of the present invention. The dispersant of the invention may be added or injected directly into a polymer melt or into a polymer solution using a solvent. The dispersant is added in the range of 0.01% to 20% by weight of the resin and the additive is present in the range of 0.01% to 30% by weight.

The additives that can be added to the resins are selected from the group consisting of (i) one or more mineral fillers, organic fillers of natural or synthetic origin or a mixture thereof wherein said one or more mineral fillers is selected from the group consisting of titanium dioxide, natural calcium carbonate, precipitated calcium carbonate, magnesium carbonate, zinc carbonate, dolomite, lime, magnesia, barium sulfate, calcium sulfate, aluminum hydroxide, magnesium hydroxide, silica, wollastonite, clays, talc, mica, solid glass spheres, hollow glass spheres, and metal oxides and wherein said organic fillers are selected from the group consisting of organic materials of natural and synthetic origin, and (ii) one or more additives selected from the group consisting of antioxidants, metal deactivators, light stabilizers, pvc stabilizers, plasticizers, lubricants, processing aids, impact modifiers, fiber reinforcements, flame retardants, antistatic agents, fluorescent whitening agents, biostabilizers, antimicrobials, chemical blowing agents, organic peroxides, nucleating agents, polymerization catalysts, grafting catalysts, thermal stabilizers, photochemical stabilizers, shrink-preventive agents, antistatic agents, mold-release agents, glass fibers, and mineral thickeners and mixtures thereof, and mixtures of (i) and (ii).

The thermal stabilizing agent is an antioxidant and is selected from the group consisting of: tetrakis[methylene 3-(3',5'-di-tert-butyl-4'-hydroxyphenyl)-propionate]-methane, octadecyl 3-(3',5'-di-tert-butyl-4-hydroxyphenyl)propionate, 1,3,5-trimethyl-2,4,6-tris-(3,5-di-tert-butyl)-4-(hydroxyl-benzyl)benzene, bis(2,4-di-tert-butyl-phenyl) pentaerythritol diphosphite, tris(mono-nonyl-phenyl) phosphite, 4,4'-butylidene-bis(5-methyl-2-tert-butyl)phenol, tris(3,5-di-tert-butyl-4-hydroxybenzyl)isocyanurate, tris-nonylphenyl phosphite, distearyl pentaerythritol diphosphite, tetrakis-(2,4-di-tert-butylphenyl)-4,4'-biphenylene diphosphonite, tris-(2,3-di-tert-butylphenyl)-phosphite, butylated hydroxy toluene, dicetyl thiodipropionate, dimyristyl thiodipropionate, and poly(1,4-cyclohexylene-3,3'-thiodipropionate, partially terminated with stearyl alcohol, as well as mixtures of any two or more thereof.

Typical antistatic agents are selected from the group consisting of glycerol monostearates, ethoxylated amines, polyethylene glycols, and quaternary ammonium compounds, as well as mixtures of any two or more thereof.

The coupling agents are selected from the group consisting of silanes titanates, chromium complexes, carboxyl-substituted polyolefins, carboxyl-substituted acrylates, and paraffins, as well as mixtures of any two or more thereof.

The UV stabilizers are selected from the group consisting of: 2-hydroxy-4-octoxybenzophenone, 2-hydroxy-4-isooctoxy-benzophenone, 4-hydroxy-4-n-dodecycloxybenzophenone, 2-(3-di-tert-butyl-2-hydroxy-5-methylphenyl-5-chlorobenzyltriazole, 2-(2-hydroxy-3,5-di-tert-amylphenyl)-benzotri-azole, para-tert-butylphenyl salicylate, 2,4-di-tert-butylphenyl-3,5-di-tert-butyl-4-hydroxybenzoate, nickel bis-ortho-ethyl(3,5-di-tert-butyl-4-hydroxybenzyl) phosphonate, and 2,2',6,6'-tetramethyl-4-piperidinyl sebacate, as well as mixtures of any two or more thereof.

The flame retardant is selected from the group consisting of: decabromodiphenyl oxide, dodecachlorodimethane dibenzocyclooctane, ethylene bis-dibromo norbornane dicarboxamide, ethylene bis-tetra-bromophthalimide, and antimony trioxide, as well as mixtures of any two or more thereof.

The metal deactivating agent is selected from the group consisting of: oxalyl bis-(benzylidene hydrazide), and 2,2'-oxamido bis-(ethyl 3-(3,5-di-tert-butyl-4-hydroxyphenyl) propionate, as well as mixtures of any two or more thereof.

The nucleating agent is selected from the group consisting of sodium benzoate, diphenyl phosphinic acid, the magnesium, sodium, calcium, and aluminum salts of diphenyl phosphinic acid, phenyl phosphinic acid, the magnesium, sodium, calcium, and aluminum salts of phenyl phosphinic acid, phenyl phosphorous acid, and the magnesium, sodium, calcium, and aluminum salts of phenyl phosphorous acid, as well as mixtures of any two or more thereof.

The resins are selected from the group consisting of: (a) a thermoplastic resin selected from the group consisting of: (i) low- or high density polyethylene, linear or branched, (ii) homo- or copolymeric polypropylenes, (iii) polyisobutylenes, (iv) copolymers of two or more of the monomers, ethylene, propylene, and butylene, (v) polyvinyl chlorides, polystyrenes, and polyolefins, optionally halogenated and optionally modified by grafting or copolymerization; polyesters, polyamides, polyolefins and polycarbonates, or a thermosetting resin selected from the group consisting of acrylic resins, phenolic resins, amino-plastic resins, epoxy resins, reactive resins used to produce polyurethanes, alkyd resins, and unsaturated polyester resins produced by condensation reactions of maleic anhydride with or without the presence of phthalic derivatives with an alkylene glycol or a low molecular weight polyalkylene glycol, in styrene wherewith said polyester is copolymerizable with said styrene.

The method of manufacturing filled polymer compounds which are preferably flowable and homogeneous (i.e., well mixed) according to the invention, is characterized in that the inventive dispersing agent is added to the mineral and/or organic fillers prior to their introduction to the resin, or to the resin prior to or after the introduction of said fillers to the resin.

The polymer compositions of the invention may be employed in any method of forming or processing of thermoplastics, such as extrusion, injection molding, calendering, etc.

EXAMPLES

The present invention is illustrated by the following Examples, but should not be construed to be limited thereto. In the Examples, "part" and "%" are all part by weight or % by weight unless specified otherwise.

The starting material for making the preferred surfactants is a compound known as cyclecanol having the following chemical structure:

The alkoxylated product is used around 3%-9%, based on 100% theoretical yield of pigment in an non-aqueous dispersion, by weight. That is, for a 35% active pigment dispersion, use roughly 4% dispersant. The product has been successfully used in acrylic latex, styrene acrylic latexes, as an emulsifier, and UV absorbers for the textile industry. It is also useful for making dispersions of kaolin clays and inorganic pigments, and as a dispersant for magnetic tape media, and as a vermiculite dispersant for polyester film. The dispersant also affects the rheological properties of the Joncryl Polymers from Johnson, thus lessening their usage rate, but allowing the same adhesion. The dispersant of the invention lowers the particle size of the pigment or particle, while retarding re-agglomeration, which in turn promotes a lower viscosity with increased stability. The product offers shorter milling times and may allow for the use of cheaper less refined pigments.

The following Examples are illustrative of the invention.

Example 1

The reaction is carried out in a Parr Pressure reactor as follows: To 1 mole equivalent of Cyclecanol, 0.1% KOH is added. The mixture is purged with $N_2$ and then the vessel is evacuated and vacuum stripped for 30 minutes at 105° C. The vessel is brought to 0 psi with $N_2$ and then EO is introduced slowly to initiate the reaction. After initiation, the EO is fed at 140° C. until 70 equiv wts of EO have been added. The product is vacuum stripped and neutralized with acetic acid prior to discharge from the reactor.

The structure of the resulting compound of example 1 is:

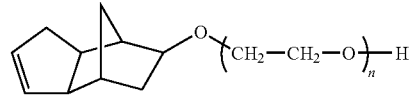

wherein n=70.

Example 2

The following components are reacted using the procedure of Example 1.

| COMPONENT | AMOUNT |
| --- | --- |
| Terpineol | one mole equivalent |
| KOH | 0.1% |
| Ethylene oxide | until 70 equivalents have been added |

The resulting product is a pale liquid.

Example 3

The following components are reacted using the procedure of Example 1.

| COMPONENT | AMOUNT |
| --- | --- |
| Adamantanol | one mole equivalent |
| KOH | 0.1% |
| Ethylene oxide | until 70 equivalents have been added |

Example 4

The following components are reacted using the procedure of Example 1.

| COMPONENT | AMOUNT |
| --- | --- |
| Cydecanol | one mole equivalent |
| KOH | 0.1% |
| Ethylene oxide | until 100 equivalents have been added |

Example 5

The following components are reacted using the procedure of Example 1.

| COMPONENT | AMOUNT |
| --- | --- |
| Cydecanol | one mole equivalent |
| KOH | 0.1% |
| Ethylene oxide | until 120 equivalents have been added |

Example 6

The following components are reacted using the procedure of Example 1.

| COMPONENT | AMOUNT |
| --- | --- |
| Cydecanol | one mole equivalent |
| KOH | 0.1% |
| EO/PO | until 50 equivalents of each oxide have been added |

Example 7

The following components are reacted using the procedure of Example 1.

| COMPONENT | AMOUNT |
| --- | --- |
| Cydecanol | one mole equivalent |
| KOH | 0.1% |
| EO/PO/BO | until 25 equivalents of each oxide have been added |

Example 8

The following components are reacted using the procedure of Example 1.

| COMPONENT | AMOUNT |
| --- | --- |
| Cydecanol | one mole equivalent |
| KOH | 0.1% |
| EO/PO/BO/SO | until 25 equivalents of each oxide have been added |

Example 9

The amount of components as outlined below are used in the preparation of a coconut fatty acid ester of the compound of Example 1.

| COMPONENT | AMOUNT |
| --- | --- |
| Compound of Example 1 | one mole equivalent |
| p-toluenesulfonic acid | 0.5 g |
| Coconut fatty acid | one mole equivalent |

Example 10

In the present example, a polymer and a plasticizer, were added to a Cowles dissolver, and the dispersant of Example 1 was added up to 4% on the total weight of the formulation, which becomes 35% Yellow 14 pigment, 4% dispersant of Example 1, and 61% di iso nonyl phthalate. Shearing is begun, and after as much as fifteen minutes a noticeable drop in viscosity occurs. At this point, pigment can be added slowly as shear is applied until the desired loading or viscosity is attained or for more color development this can be taken to a media mill, such as a Hoover or and Eiger Mill.

Example 11

A plastisol was added to a Cowles dissolver, and the dispersant of Example 1 was added up to 4% on the total weight of the formulation, which becomes 35% Yellow 14 pigment, 4% Example 1 dispersant, and 61% plastisol. Shearing is begun, and after as much as fifteen minutes a noticeable drop in viscosity occurs. At this point, pigment can be added slowly as shear is applied until the desired loading or viscosity is attained or for more color development this can be taken to a media mill, such as a Hoover or and Eiger Mill.

Example 12

A mixture consisting of 11.1 kg of 1% strength aqueous ammonia, 18.0 kg of titanium dioxide pigment (rutile type) 15.0 kg of barium sulphate pigment, 10.5 kg of ground dolomite, 2.0 kg of talc, 0.3 kg of high-molecular silica for preventing the pigment from settling out in the paste, 0.1 kg of a commercially available preservative, 0.2 kg of sodium hexamethaphosphate, 0.3 kg of a commercially available antifoaming mixture, 0.5 kg of a nonionic emulsifier and 5.0 kg of a 3% strength aqueous solution of hydroxyethylcellulose is homogenised by means of a high-speed stirrer. It is then ground on a single-roll mill and 37 kg of an acrylic resin dispersion are added, while stirring vigorously.

A paint which is stable against flocculation is obtained by stirring 100 g of this white emulsion paint with 0.1 to 10 g of a pigment preparation produced in accordance with Example 5. When this paint is spread on paper with a 0.09 mm doctor blade, a distinctly greater depth of colour is obtained, compared with analogous emulsion paints.

Example 13

200 g of an unsaturated polyester resin polymerizable at low temperature (Palatal® P4, marketed by BASF) is introduced without stirring into a metal pot of capacity c. 500 mL which is equipped with a Pendraulik® laboratory stirrer having a vane of 5 cm diameter. Then 6 g of the dispersing agent OF Example 1 being tested is introduced. The stirrer is then run 30 sec to thoroughly intermix the contents. Then 600 g natural calcium carbonate (Millicarb®, marketed by the firm Omya S.A.) is added over 10 min, under stirring. The stirring is continued an additional 5 min. After the 15 min total mixing time, a sample of the polymer compound is conditioned at 30° C. for 2 hr, and another sample for 24 hr, following which the respective Brookfield viscosities are measured at 30° C. with the aid of a type HBT Brookfield viscosimeter, at different shear rates (5 rpm, 10 rpm, 20 rpm, and 50 rpm).

Example 14

A composition is prepared by introducing 600 g natural calcium carbonate (Millicarb, marketed by the firm Omya S.A.) into a Z-arm "Guittard" mixer preheated to 200° C., followed by addition of 6 g of the dispersant of Example 1 being tested. After mixing the filler (with or without dispersant) at 12 rpm for 15 min, 400 g polystyrene (Lacqrene® 7240 grade 4, marketed by the firm Atochem), 1.0 g of a stabilizer (Irganox® 1010, marketed by Ciba-Geigy), and 6 g of the dispersant being tested (if not added previously to the charge), are introduced to the chamber of the mixer. Mixing is carried out 10 min at 12 rpm, followed by gradual increases of the mixer speed to 47 rpm over 10 min, and then to 76 rpm over another 10 min.

Example 15

A master batch is prepared by introducing 600 g magnesium hydroxide filler (Magnifin® H5, marketed by the firm Martinswerke) into a Z-arm "Guittard" mixer preheated to 230° C., mixing the filler 15 min at 12 rpm, and introducing 400 g polypropylene (Laqtene® 3120 MN1, marketed by the firm Appryl) to the mixer chamber, along with 1.0 g of a stabilizer (Irganox® 1010, marketed by Ciba-Geigy) and 6 g of the dispersant of Example 1. Mixing is carried out 10 min at 12 rpm, followed by gradual increases of the mixer speed to 47 rpm over 10 min, and then to 76 rpm over another 5 min.

Example 16

160 g of a dioctyl phthalate plasticizer is introduced without stirring into a metal pot of capacity of 1000 mL which is equipped with a top-mounted Pendraulik® laboratory stirrer having a vane of diameter 7.5 cm. Then 2 g of a stabilizer based on barium and zinc and 2 g of the dispersant of Example 1 are introduced. The mixture is mixed thoroughly for 30 sec using the stirrer, following which 200 g of a PVC (PB 1302, marketed by the firm Atochem) and 200 g natural calcium carbonate (Millicarb®, marketed by the firm Omya S.A.) are added over a period of 10 min, under stirring. Stirring is continued for an additional 16 min. A sample of the polymer compound is conditioned at 23° C. for 2 hr, and another sample for 24 hr, following which the respective Brookfield viscosities are measured at 23° C. with the aid of a type HBT Brookfield viscosimeter, at different shear rates (5 rpm, 10 rpm, 20 rpm, 50 rpm, and 100 rpm).

Example 17

A master batch is prepared by introducing 500 g TiO$_2$ filler into a Z-arm "Guittard" mixer preheated to 250° C., mixing the filler 15 min at 12 rpm, and introducing 400 g polypropylene (Laqtene® 3120 MN1, marketed by the firm Appryl) to the mixer chamber, along with 1.0 g of a stabilizer (Irganox® 1010, marketed by Ciba-Geigy) and 6 g of the dispersant of Example 1. Mixing is carried out 10 min at 12 rpm, followed by gradual increases of the mixer speed to 47 rpm over 10 min, and then to 76 rpm over another 5 min.

Example 18

A master batch is prepared by introducing 100 g decabromodiphenyl ether flame retardant into a Z-arm "Guittard" mixer preheated to 200° C., mixing the filler 15 min at 12 rpm, and introducing 400 g polyethylene terephthalate to the mixer chamber, and 4 g of the dispersant of Example 1. Mixing is carried out 10 min at 12 rpm, followed by gradual increases of the mixer speed to 47 rpm over 10 min, and then to 76 rpm over another 5 min.

Example 19

Several pigment dispersions using different pigments were made as follows:

The method of incorporation involved weighing the liquid ingredients into a blender container; these were mixed for 20 seconds to homogenize. Next, the pigment was added in three equal parts. Each part was mixed in and wetted before the next part was added.

After incorporating all the pigment, this mixture (termed the premix) was blended for 10 minutes to begin the process of pigment wetting and separation.

Once the ingredients had been premixed, the formulation was introduced to an Eiger Mini-100 horizontal media mill. The mill contained approximately 75 g of 0.8 mm YTZ (yttrium tetragonal zirconia) media, and was operated at a speed of 5000 rpm to process the samples. Each sample was milled for 10 minutes.

The dispersant used in the Examples below was a POE (70) cyclecanol with the following structure:

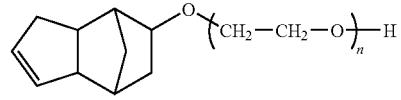

n = 70+

The viscosities of the dispersions were measured using a Brookfield viscometer. In general, lower viscosity and pseudoplastic character is desirable.

For purposes of the discussion below, the material will be referred to as "CE" (cyclecanol ethoxylate).

The study was undertaken to evaluate the effects of this novel additive on color development, ink transfer, pigment loading, and viscosity/color stability. The materials and conditions that were evaluated in this study were:

Phthalo Blue 15:3 pigment dispersion with BL 1531 pigment (Magruder Color Company) at different CE levels (0.5 to 2.0%) vs. Surfynol CT 136 (competitive product from Air Products) at a 2% addition level.

Lithol Rubine Red 57:1 pigment dispersion with LR 1392 pigment (Magruder Color Company) at different CE levels (0.5 to 2.0%) vs. Surfynol CT 171 (competitive product from Air Products) at a 2% addition level.

Diarylide Yellow 14 pigment dispersion with YE 1403 semi transparent pigment (Magruder Color Company) at a 1% surfactant level (CE vs. Surfynol CT 121 from Air Products).

Regal 660 R carbon black (Cabot Corp.) pigment dispersion with 2% levels of CE and CT 324 (Air Products).

Black Pearls 450 at 2% CE.

All of the formulations prepared and their properties are summarized in the tables below:

TABLE 1

Phthalo Blue Formulas

| | ETH 20105-1 | -2 | -3 | -4 | -5 |
|---|---|---|---|---|---|
| BL 1531 | 38.00 | 38.00 | 38.00 | 38.00 | 38.00 |
| CT 136 | 3.85 | 0.00 | 0.00 | 0.00 | 0.00 |
| Cydecanol ethoxylate, 50% | 0.00 | 1.00 | 2.00 | 3.00 | 4.00 |
| Joncryl 63 | 27.69 | 27.69 | 27.69 | 27.69 | 27.69 |
| Byk 022 | 0.90 | 0.90 | 0.90 | 0.90 | 0.90 |
| Water | 29.56 | 32.41 | 31.41 | 30.41 | 29.41 |
| | 100.00 | 100.00 | 100.00 | 100.00 | 100.00 |
| Surfactant actives: | 2.00 | 0.50 | 1.00 | 1.50 | 2.00 |
| Actives on pigments solids: | 5.27 | 1.32 | 2.63 | 3.95 | 5.26 |
| P/B | 4.50 | 4.50 | 4.50 | 4.50 | 4.50 |

Joncryl 63 is a styrene/acrylic dispersion sold by Johnson polymers.
BYK ®-022 is a silicone based defoamer sold by BYK Chemie

TABLE 2

Lithol Rubine Formulas

| | ETH 12505-1 | -2 | -3 | -4 | -5 |
|---|---|---|---|---|---|
| LR 1392 | 37.50 | 37.50 | 37.50 | 37.50 | 37.50 |
| CT 171 | 4.17 | 0.00 | 0.00 | 0.00 | 0.00 |
| Cydecanol ethoxylate, 50% | 0.00 | 1.00 | 2.00 | 3.00 | 4.00 |
| Joncryl 171 | 29.76 | 29.76 | 29.76 | 29.76 | 29.76 |
| Byk 022 | 0.90 | 0.90 | 0.90 | 0.90 | 0.90 |
| Water | 27.67 | 30.84 | 29.84 | 28.84 | 27.84 |
| | 100.00 | 100.00 | 100.00 | 100.00 | 100.00 |
| Surfactant actives: | 2.00 | 0.50 | 1.00 | 1.50 | 2.00 |
| Actives on pigments solids: | 5.34 | 1.33 | 2.67 | 4.00 | 5.33 |
| P/B | 4.50 | 4.50 | 4.50 | 4.50 | 4.50 |

TABLE 3

Diarylide Yellow Formulas

| | ETH 12805-1 | -2 |
|---|---|---|
| Magruder YE 1403 | 36.00 | 36.00 |
| CT 121 | 1.44 | 0.00 |
| POE (70) 50% solution | 0.00 | 2.00 |
| Joncryl 63 | 25.11 | 25.11 |

TABLE 3-continued

Diarylide Yellow Formulas

| | ETH 12805-1 | -2 |
|---|---|---|
| Byk 022 | 1.00 | 1.00 |
| Water | 36.45 | 35.89 |
| | 100.00 | 100.00 |
| Surfactant actives: | 1.01 | 1.00 |
| Actives on pigment solids: | 2.80 | 2.78 |
| P/B: | 4.70 | 4.70 |

TABLE 4

Black Formulas

| | ETH 12405-1 | -2 | -3 | -4 |
|---|---|---|---|---|
| Regal 660R | 37.50 | 37.50 | 37.50 | 0.00 |
| BP 450 | 0.00 | 0.00 | 0.00 | 38.00 |
| CT 324 | 0.00 | 0.00 | 4.26 | 0.00 |
| Cydecanol ethoxylate, 50% | 4.00 | 0.00 | 0.00 | 4.00 |
| Joncryl 63 | 27.78 | 27.78 | 27.78 | 28.15 |
| Byk 022 | 0.90 | 0.90 | 0.90 | 0.90 |
| Water | 29.82 | 33.82 | 29.56 | 28.95 |
| | 100.00 | 100.00 | 100.00 | 100.00 |
| Surfactant actives: | 2.00 | 0.00 | 2.00 | 2.00 |
| Actives on pigment solids: | 5.33 | 0.00 | 5.34 | 5.26 |
| P/B: | 4.82 | 4.82 | 4.82 | 4.82 |

The Milling Parameters for the Cyclecanol Ethoxylate dispersant are summarized in the following tables:

TABLE 5

| | Temperature | Amperage | pH | Comments |
|---|---|---|---|---|
| Blue - 38% pigment | | | | |
| ETH 20105-1 | 41 | 3 | 8.94 | 2% CT 136 |
| -2 | 32 | 2.75 | 9.12 | 0.5% CE |
| -3 | 32 | 2.75 | 9.4 | 1.0% CE |
| -4 | 35 | 3 | 8.99 | 1.5% CE |
| -5 | 36 | 2.75 | 8.63 | 2.0% CE |
| Red - 27.5% pigment | | | | |
| ETH 20105-1 | 36 | 3 | 8.42 | 2% CT 171 |
| -2 | 31 | 2.75 | 8.81 | 0.5% CE |
| -3 | 35 | 2.75 | 8.64 | 1.0% CE |
| -4 | 38 | 3 | 8.9 | 1.5% CE |
| -5 | 43 | 3.25 | 8.96 | 2.0% CE |
| Yellow - 36% pigment | | | | |
| ETH 20105-1 | 32 | 2.5 | 8.39 | 1% CT 121 |
| -2 | 29 | 2.25 | 8.14 | 1.0% CE |
| Black - 37.5% pigment | | | | |
| ETH 20105-1 | 36 | 3.5 | 8.39 | 2.0% CE |
| -2 | | | 8.81 | No surfactant |
| -3 | 28 | 2.25 | 8.76 | 2.0% CT 324 |
| -4 | 42 | 4 | 8.46 | BP 450 pigment, 38% |

The amount of work done on the sample can be ascertained from the amperage draw experienced by the mill during processing. Additionally, a rise in sample temperature is an additional confirmation that high shear forces are being generated during dispersion. High shear force generation often leads to better dispersions with higher color development. Workloads for equivalent actives levels of CE and the competitive surfactant seemed to be similar.

One variation that was not tried was using LESS of the competitive surfactant. This is because the use levels recommended by the supplier were followed.

The data in the tables can be summarized as follows:

Phthalo Blue: Viscosities of all the dispersions containing CE were substantially lower than that of the control dispersion with CT 136. The control also had substantial pseudoplastic behavior, whereas the CE containing dispersions were much more Newtonian. The 48 hour aged viscosities of the dispersions demonstrated the lowest gains with 1.0% and 2.0% CE.

Lithol Rubine: Viscosities of all the dispersions containing CE were substantially lower than that of the control dispersion with CT 171. The control also had substantial pseudoplastic behavior, whereas the CE containing dispersions were much more Newtonian. 1% CE seemed to be the ideal level for viscosity minimization with this particular pigment.

The lithol rubine dispersions were subsequently reduced with water to 35% pigment and heat aged for three days at 50° C. These results showed that no viscosity gains were noted with 1.0 and 1.5% CE nor with the CT 171 standard. 0.5% and 2.0% CE showed slight viscosity rises.

Diarylide Yellow: Again, the CE containing dispersion was substantially less viscous and pseudoplastic vs. the control:

Black: The black dispersions showed analogous behavior, with substantially lower viscosity and pseudoplasticity from the CE containing formula, vs. the control (which contained no surfactant—the CT 324 containing formulation was too viscous to be measured):

The above example and summary tables demonstrate that substantial viscosity reduction of dispersions and inks is obtained with the use of CE as a pigment dispersant in water base formulations. From the blue and red work, it was noted that 1.0-1.5% levels of the CE were optimum for viscosity reduction.

Example 20

Tint strengths were made of the dispersions; each formulation was drawn down vs. others of the same color on Leneta 3NT-4 paper. The composition of the tint formula was 50.00 g of Sherwin Williams Extra White Tint Base and 0.50 g of dispersion. These were mixed on a Hauschild centrifugal mixer at 1800 rpm for 1 minute.

The purpose of evaluating tint strength is to ascertain the amount of color generated during milling. One formulation is designated as the standard and is assigned the value of 100. The percent deviation in color strength (as indicated by optical density measurements) of the other samples is computed versus this standard.

Optical density of the samples was measured with an XRite 418 densitometer and converted to reflectance values by:

$$R = 10^{-O.D.}$$

Then, reflectance values for standard and samples are compared using the Kubelka-Munk equation:

$$\text{Percent strength vs. standard} = \frac{\frac{(1-R_u)^2}{2R_u}}{\frac{(1-R_s)^2}{2R_s}} \times 100$$

The following results were obtained:

Phthalo blue: color strength development was slightly higher for 0.5% and 1.5% CE vs. the Surfynol standard. The 1% CE demonstrated equivalent color development to the 2% Surfynol.

Lithol Rubine: color development with all levels of CE equivalent to that of the control with Surfynol CT 171.

Diarylide Yellow: color development with 1% CE equivalent to that of 1% CT 121.

Black: The control formula with no surfactant was substantially more viscous than that containing CE, and developed slightly more color as a result, approximately 3%. The formula containing CT 324 was too viscous to be measured.

The viscosities of the dispersions were measured using a Brookfield viscometer. In general, lower viscosity and pseudoplastic character is desirable.

Phthalo Blue: Viscosities of all the dispersions containing CE were substantially lower than that of the control dispersion with CT 136. The control also had substantial pseudoplastic behavior, whereas the CE containing dispersions were much more Newtonian. The 48 hour aged viscosities of the dispersions demonstrated the lowest gains with 1.0% and 2.0% CE:

TABLE 6

| | | Aged Phthalo Blue Dispersions - 48 hrs. | | | |
|---|---|---|---|---|---|
| RPM | ETH 20105-1 2% CT 136 | ETH 20105-2 0.5% Cydecanol Ethoxylate | ETH 20105-3 1% Cydecanol Ethoxylate | ETH 20105-4 1.5% Cydecanol Exthoxylate | ETH 20105-5 2% Cydecanol Ethoxylate |
| 1.5 | 92160 | 2190 | 1210 | 2310 | 940 |
| 3 | 57410 | 1930 | 1030 | 2080 | 810 |
| 6 | 34940 | 1710 | 900 | 1840 | 720 |

TABLE 6-continued

| | | Aged Phthalo Blue Dispersions - 48 hrs. | | | |
|---|---|---|---|---|---|
| RPM | ETH 20105-1 2% CT 136 | ETH 20105-2 0.5% Cydecanol Ethoxylate | ETH 20105-3 1% Cydecanol Ethoxylate | ETH 20105-4 1.5% Cydecanol Exthoxylate | ETH 20105-5 2% Cydecanol Ethoxylate |
| 12 | 22250 | 1440 | 800 | 1600 | 660 |
| 30 | 11990 | 1120 | 660 | 1320 | 580 |
| 60 | 7040 | 920 | 580 | 1120 | 520 |

Lithol Rubine: Viscosities of all the dispersions containing CE were substantially lower than that of the control dispersion with CT 171. The control also had substantial pseudoplastic behavior, whereas the CE containing dispersions were much more Newtonian. 1% CE seemed to be the ideal level for viscosity minimization with this particular pigment:

TABLE 7

| | | Lithol Rubine Dispersion Viscosities - 24 hr. | | | |
|---|---|---|---|---|---|
| RPM | ETH 20105-1 2% CT 171 | ETH 20105-2 0.5% Cydecanol Ethoxylate | ETH 20105-3 1% Cydecanol Ethoxylate | ETH 20105-4 1.5% Cydecanol Exthoxylate | ETH 20105-5 2% Cydecanol Ethoxylate |
| 1.5 | 92460 | 7470 | 4370 | 11010 | 14070 |
| 3 | 56870 | 5770 | 3680 | 8370 | 10590 |
| 6 | 35410 | 4340 | 2920 | 6250 | 7820 |
| 12 | 22400 | 3200 | 2280 | 4600 | 5710 |
| 30 | 12180 | 2120 | 1630 | 4570 | 3720 |
| 60 | 7450 | 1520 | 1220 | 3060 | |

The lithol rubine dispersions were subsequently reduced with water to 35% pigment and heat aged for three days at 50° C. These results showed that no viscosity gains were noted with 1.0 and 1.5% CE nor with the CT 171 standard. 0.5% and 2.0% CE showed slight viscosity rises. Additional tint strengths were also assessed on these samples to see if any color loss occurred with heating. It was noted that after 72 hours heat aging, the CE containing samples had lost some color vs. standard, but had maintained excellent low viscosities.

Diarylide Yellow: Again, the CE containing dispersion was substantially less viscous and pseudoplastic vs. the control:

| RPM | ETH 12805-1 1.0% ct 121 | ETH 12805-2 1.0% Cydecanol Ethoxylate |
|---|---|---|
| 1.5 | 11600 | 430 |
| 3 | 7240 | 260 |
| 6 | 4620 | 180 |
| 12 | 3010 | 140 |
| 30 | 1730 | 120 |
| 60 | 1130 | 110 |

Black: The black dispersions showed analogous behavior, with substantially lower viscosity and pseudoplasticity from the CE containing formula, vs. the control (which contained no surfactant—the CT 324 containing formulation was too viscous to be measured):

TABLE 8

| | Black Dispersions - Initial | |
|---|---|---|
| RPM | ETH 12405-1 2% CE | ETH 12405-2 No surfactant |
| 1.5 | 1128 | |
| 3 | 1086 | 91310 |
| 6 | 1050 | 54160 |
| 12 | 983 | 31490 |
| 30 | 852 | 15430 |
| 60 | | 8540 |

Water based flexographic printing inks were also made from the reduced dispersions. These were prepared by combining 17.5 g of dispersion with 32.5 g of masstone vehicle. This yielded inks with pigment loadings of:

| Phthalo Blue: | 13.3% |
|---|---|
| Lithol Rubine: | 13.125% |
| Diarylide Yellow: | 12.6% |
| Black: | 13.125% |

The composition of the masstone vehicle is:

| | |
|---|---|
| ECO 2177 | 68.42 |
| Joncryl 63 | 26.32 |
| Water | 5.26 |
| TOTAL | 100.00 |

Using a Pamarco hand proofer fitted with a 550 line ceramic laser engraved anilox with 2.8 bcm capacity, the inks were printed down side by side on Leneta 3NT-3, 7 mil polyester film and foil (Leneta Alu-Card) and compared for color density, gloss, and transparency. Initially, Brookfield viscosities of the inks were measured, and this was repeated at 48 hours.

Phthalo Blue: Similar viscosity suppression behavior as had been noted for the dispersions was also seen in the inks. The control ink and the 1.5% CE level experienced the highest rise in viscosity over 48 hrs. The 1.0% and 2.0% CE levels experienced minimal viscosity increases.

| | Phthalo Blue Inks - initial and 48 hrs. | | | | | | | | | |
|---|---|---|---|---|---|---|---|---|---|---|
| RPM | ETH 20105-1 2% CT136 initial | ETH 20105-1 2% CT 136-48 hrs | ETH 20105-2 0.5% CE initial | ETH 20105-2 0.5% CE 48 hrs | ETH 20105-3 1% CE initial | ETH 20105-3 1% CE 48 hrs. | ETH 20105-4 1.5% CE initial | ETH 20105-4 1.5% CE 48 hrs. | ETH 20105-5 2% CE initial | ETH 20105-5 2% CE 48 hrs. |
| 1.5 | 556 | 942 | 236 | 447 | 246 | 303 | 361 | 981 | 473 | 523 |
| 3 | 505 | 739 | 208 | 298 | 193 | 285 | 347 | 752 | 356 | 424 |
| 6 | 442 | 612 | 191 | 286 | 186 | 273 | 341 | 671 | 352 | 403 |
| 12 | 374 | 503 | 177 | 258 | 171 | 255 | 326 | 587 | 339 | 379 |
| 30 | 302 | 398 | 160 | 228 | 161 | 225 | 297 | 477 | 333 | 330 |
| 60 | 260 | 338 | 148 | 204 | 152 | 203 | 273 | 411 | 307 | 290 |

Lithol Rubine: Ideal ink viscosities were seen at 1% CE levels (in the dispersion):

| | Lithol Rubine Ink Viscosities | | | | |
|---|---|---|---|---|---|
| RPM | ETH 12505-1 2% CT 171 | ETH 12505-2 0.5% Cydecanol Ethoxylate | ETH 12505-3 1% Cydecanol Ethoxylate | ETH 12505-4 1.5% Cydecanol Ethoxylate | ETH 12505-5 2% Cydecanol Ethoxylate |
| 1.5 | 624 | 618 | 235 | 666 | |
| 3 | 463 | 353 | 207 | 344 | |
| 6 | 436 | 293 | 202 | 265 | 382 |
| 12 | 415 | 284 | 192 | 256 | 378 |
| 30 | 379 | 260 | 176 | 242 | 360 |
| 60 | 346 | 251 | 165 | 228 | 331 |

Diarylide Yellow: Again, substantial increases in pseudoplastic character were seen with the control over 48 hrs, but less so with CE:

| | Dyalide Yellow Inks - initial and 48 hrs. | | | |
|---|---|---|---|---|
| RPM | ETH 12805-1 1% CT 171 initial | ETH 12805-1 1.0% CT 121 48 hrs | ETH 12805-2 1.0% CE initial | ETH 12805-2 1.0% CE - 48 hrs |
| 1.5 | 168 | 502 | 142 | 238 |
| 3 | 157 | 373 | 115 | 139 |
| 6 | 152 | 298 | 103 | 127 |
| 12 | 143 | 234 | 97 | 125 |
| 30 | 131 | 180 | 81 | 114 |
| 60 | 110 | 149 | 73 | 99 |

Black: Suitable inks were not able to be made from the dispersion containing CT 324. A control was made containing no surfactant and this was more viscous than that containing 2% CE. It is quite probable that even lower viscosities would have been achieved with lower levels of CE (around the 1% optimum seen for the blue and red work):

| | Black Inks - initial | |
|---|---|---|
| RPM | ETH 12405-1 2% CE | ETH 12405-2 No surfactant |
| 1.5 | 2417 | 3765 |
| 3 | 1117 | 2131 |
| 6 | 730 | 1273 |
| 12 | 484 | 749 |
| 30 | 333 | 426 |
| 60 | 255 | 310 |

Visual results showed that:

Phthalo Blue—the control was equivalent in color strength than the ink containing 2% CE, and darker than the remaining CE containing inks; however, it was also substantially more viscous than all of these inks—which could account for the differences.

Lithol Rubine—the control was equivalent in color strength than the ink containing 2% CE, and darker than the remaining CE containing inks; however, it was also substantially more viscous than all of these inks—which could account for the differences.

Diarylide Yellow—the control and the CE inks were equivalent in color strength

Black—the CE containing ink was substantially more dense than the control, which contained no surfactant (inks were not made from the control containing CT 324, as it was too viscous).

Although the present invention has been described with reference to specific details of certain embodiments thereof, it is not intended that such detail should be regarded as limitations upon the scope of the invention, except as and to the extent that they are included in the accompanying claims.

What is being claimed is:

1. A compound having the formula

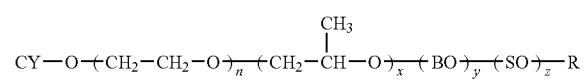

wherein CY is selected from the group consisting of:

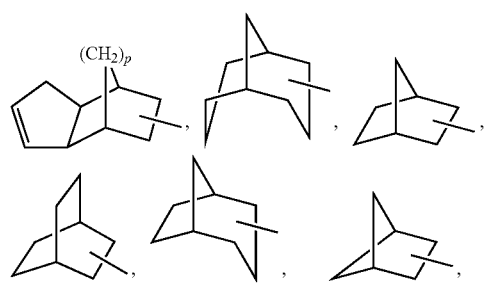

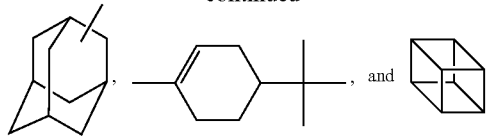

wherein p=0-2; (n+x+y+z)>1; and R=—H, —SO$_3$M, —CO$_2$M, —PO$_3$M, —OCR' wherein M=H, or Na, K, Li, Ca, Mg, NH4, NH(R$_1$)$_2$, NH$_2$R$_1$, N(R$_1$)$_3$ where R$_1$ is selected from the group consisting of C$_1$-C$_6$ alkyl and C$_1$-C$_6$ hydroxyalkyl; and R' =C$_2$-C$_{22}$ alkyl or alkenyl.

2. A compound according to claim 1 wherein CY is

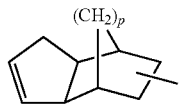

wherein p=0-2.

3. A compound according to claim 2 wherein p=1.

4. A compound according to claim 3 wherein n=1-300, x=0, y=0, z=0 and R=H.

5. A compound according to claim 4 having the formula

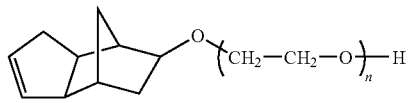

wherein n=70.

6. A pigment dispersion comprising:
(a) a pigment;
(b) a solvent; and
(c) a dispersing surfactant the formula:

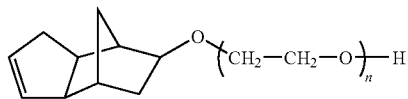

wherein n=70.

7. The pigment dispersion of claim 6 wherein said pigment is an inorganic pigment.

8. The pigment dispersion of claim 6 wherein said pigment is an organic pigment.

9. The pigment dispersion of claim 6 wherein said dispersion further contains a polymeric resin.

10. A polymer composition comprising:
(a) a thermoplastic resin selected from the group consisting of: (i) low- or high density polyethylene, linear or branched, (ii) homo- or copolymeric polypropylenes, (iii) polyisobutylenes, (iv) copolymers of two or more of the monomers, ethylene, propylene, and butylene, (v) polyvinyl chlorides, polystyrenes, and polyolefins, optionally halogenated and optionally modified by grafting or copolymerization; polyesters, polyamides, polyolefins and polycarbonates, or a thermosetting resin selected from the group consisting of acrylic resins, phenolic resins, amino-plastic resins, epoxy resins, reactive resins used to produce polyurethanes, alkyd resins, and unsaturated polyester resins produced by condensation reactions of maleic anhydride with or without the presence of phthalic derivatives with an alkylene glycol or a low molecular weight polyalkylene glycol, in styrene wherewith said polyester is copolymerizable with said styrene;

(b) an additive selected from the group consisting of: (i) one or more mineral fillers, organic fillers of natural or synthetic origin or a mixture thereof wherein said one or more mineral fillers is selected from the group consisting of titanium dioxide, natural calcium carbonate, precipitated calcium carbonate, magnesium carbonate, zinc carbonate, dolomite, lime, magnesia, barium sulfate, calcium sulfate, aluminum hydroxide, magnesium hydroxide, silica, wollastonite, clays, talc, mica, solid glass spheres, hollow glass spheres, and metal oxides and wherein said organic fillers are selected from the group consisting of organic materials of natural and synthetic origin, and (ii) one or more additives selected from the group consisting of antioxidants, metal deactivators, light stabilizers, pvc stabilizers, plasticizers, lubricants, processing aids, impact modifiers, fiber reinforcements, flame retardants, antistatic agents, fluorescent whitening agents, biostabilizers, antimicrobials, chemical blowing agents, organic peroxides, nucleating agents, polymerization catalysts, grafting catalysts, thermal stabilizers, photochemical stabilizers, shrink-preventive agents, antistatic agents, mold-release agents, glass fibers, and mineral thickeners and mixtures thereof, and mixtures of (i) and (ii); and (c) a dispersant of the formula

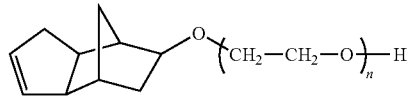

wherein n=70.

11. A polymeric composition comprising:
(a) a polymer;
(b) an inorganic or organic additive; and
(c) a dispersant of the formula

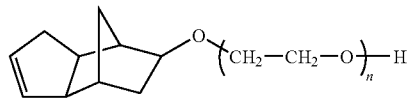

wherein n=70.

* * * * *